United States Patent [19]

Hewlett

[11] 3,843,171
[45] Oct. 22, 1974

[54] CRYOGENIC TRANSFER SWIVEL
[75] Inventor: James A. Hewlett, Forest Park, Ohio
[73] Assignee: KDI Corporation, Cincinnati, Ohio
[22] Filed: Jan. 26, 1973
[21] Appl. No.: 326,656

[52] U.S. Cl................... 285/98, 285/134, 285/375, 285/DIG. 5
[51] Int. Cl............................................. F16l 17/00
[58] Field of Search............ 285/134, 93, 99, 133 R, 285/375, 279, DIG. 5

[56] References Cited
UNITED STATES PATENTS

| | | | |
|---|---|---|---|
| 2,983,506 | 5/1961 | Bertsch et al. | 285/133 R X |
| 3,107,107 | 10/1963 | Guarnaschelli | 285/375 X |
| 3,136,568 | 6/1964 | Ragsdale | 285/134 |
| 3,514,127 | 5/1970 | Brooker | 285/98 |
| 3,591,206 | 7/1971 | Giovagnoli | 285/98 |

Primary Examiner—Dave W. Arola
Attorney, Agent, or Firm—Sughrue, Rothwell, Mion, Zinn & Macpeak

[57] ABSTRACT

A transfer swivel connector assembly for connecting two insulated fluid conduits which provides an evacuated space around the conduit connection within the swivel assembly to form a highly efficient insulating layer and incorporates bearing means to allow virtually friction-free rotational movement of the two conduits relative to each other about a desired axis. The swivel assembly further provides dynamic secondary sealing means to prevent the escape of fluid from the connector should the primary transfer passage connection develop a leak.

8 Claims, 3 Drawing Figures

CRYOGENIC TRANSFER SWIVEL

BACKGROUND OF THE INVENTION

1. Field of the Invention

This invention relates to a swivel connection assembly for joining two insulated conduits which provides a highly efficient insulated, sealed connection between the conduits, while allowing virtually friction-free swivel movement between the two conduits without any loss in insulating properties or leakage of fluid.

2. Description of the Prior Art

The prior art swivel connections employed for the transfer of various liquids have been generally constructed by forming passages in solid blocks of material and joining these blocks of material together. Although previous swivel connection assemblies for joining two conduits have been provided with ball bearings to reduce friction between the elements and have also included means for supporting internal connection tubes in a spaced-apart relationship from an outer member, these prior art devices were generally permanent or semi-permanent connections.

One of the main disadvantages of the prior art swivel connection assemblies has been the failure to provide a highly efficient insulating layer around the internal connection within the swivel assembly. None of the prior art devices have provided internal connection constructions which enable the connection to be easily connected or disconnected and which incorporate an internal conduit connection seal, while maintaining the connecting conduits in a spaced-apart relationship with the outer housings of the swivel connection assembly, with the space therebetween being evacuated and maintained under a high vacuum to form an insulating sapce between the conduits and the outer housing. Furthermore, none of the prior art swivel connection assemblies provided dual sealing means to isolate the internal passage from the ambient atmosphere and prevent escape of the fluid being transferred, should the internal conduit connection develop a leak. For the most part, the prior art devices employ a single conduit within the swivel assembly.

Although certain prior art fluid coupling assemblies incorporate a telescopic internal member for connection with a female member, with the two connection members being mounted in a spaced-apart relationship with an outer housing for insulation purposes, these prior art coupling assemblies do not provide a transfer swivel connection, but are used to join flexible straight conduits in an axial manner.

SUMMARY OF THE INVENTION

One of the objects of the present invention is to provide a swivel connection assembly for connecting two insulated conduits and maintaining an evacuated insulating space around the internal connection of the transfer conduit to obtain efficient transfer of fluids at high temperature differentials.

Another object of the present invention is to provide a fluid transfer swivel connection assembly which allows freedom of motion about a desired axis at all times with low torque requirements.

A further object of the present invention is to provide a swivel connection assembly having a dynamic secondary seal to prevent the escape of fluids being transferred through the swivel connection should a leak develop in a primary transfer connection passage.

A still further object of the present invention is to provide a transfer swivel connection assembly which can be used to achieve continuous efficient transfer of cryogenic fluids while maintaining complete rotational motion about a desired axis.

A still further object of the present invention is to present a transfer swivel connection assembly that is easily assembled and disassembled with a minimum of effort and without damage to either the connector or the conduits being joined.

These objects are accomplished by the structure of the present invention which includes two conduit connectors rigidly mounted within separate housings, with an evacuated space insulation layer being formed between the connection passages and the housing. Secondary sealing means and bearings are provided to form a secondary seal around the connection passages and reduce the friction during rotation of one conduit relative to the other. The connector assembly may be easily disassembled by removing bolts retaining the two housings together.

DESCRIPTION OF THE PREFERRED EMBODIMENT

Figure 2:
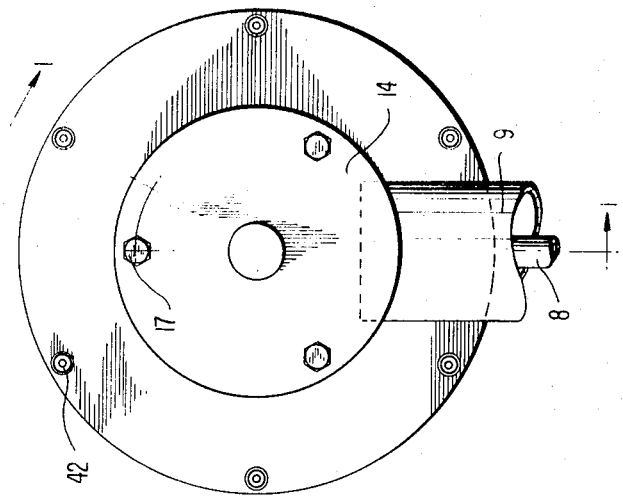
FIG. 2 is an exterior end view of the right end of FIG. 1, showing the means for removably connecting the two sections together and for mounting the assembly.
Figure 1:
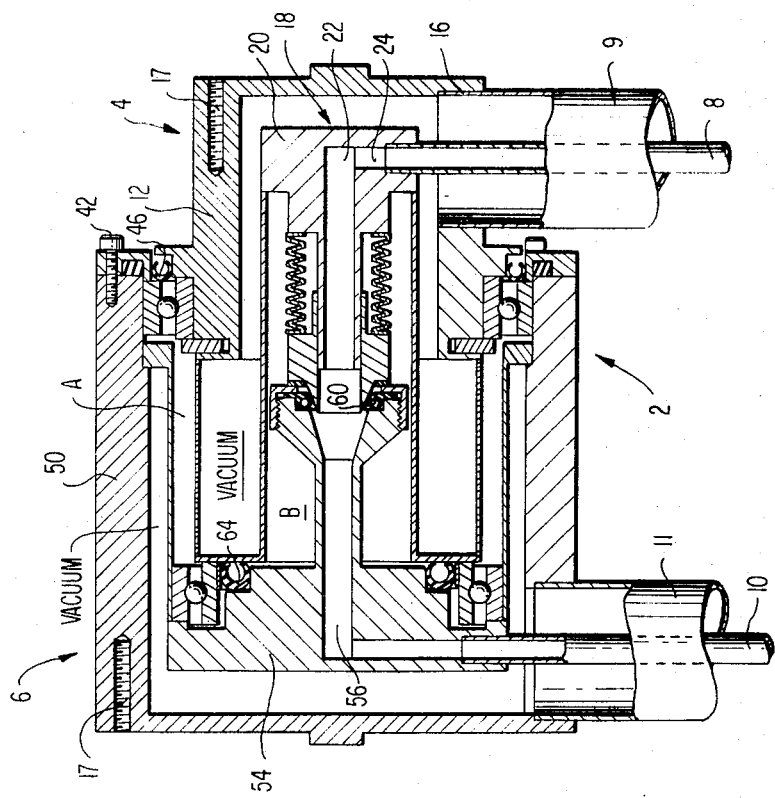
FIG. 1 is a longitudinal cross-sectional view of a first embodiment of the transfer swivel connection assembly according to the present invention showing the conduits in the connected state.
Figure 3:
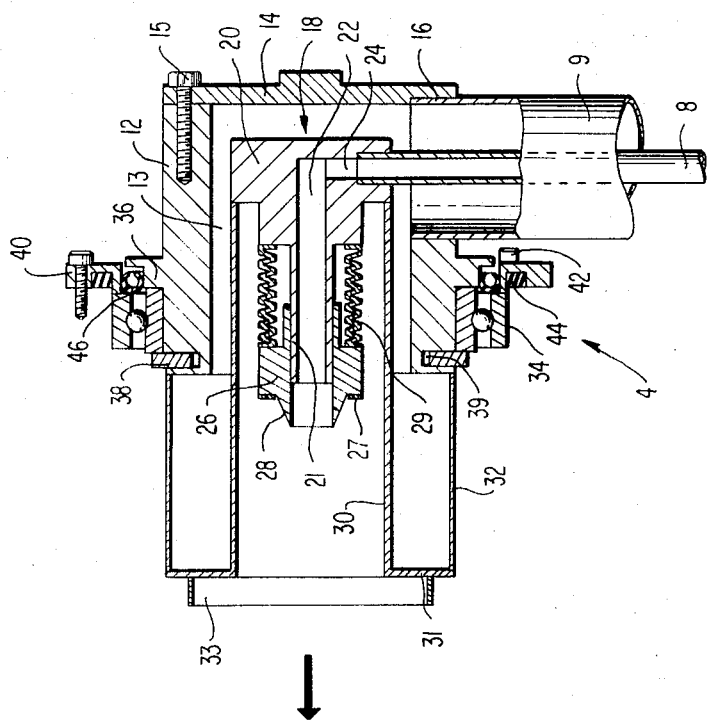
FIG. 3 is a longitudinal cross-sectional view of a second embodiment of the transfer swivel connection assembly according to the present invention showing the two sections thereof in the disassembled state.
Figure 3:
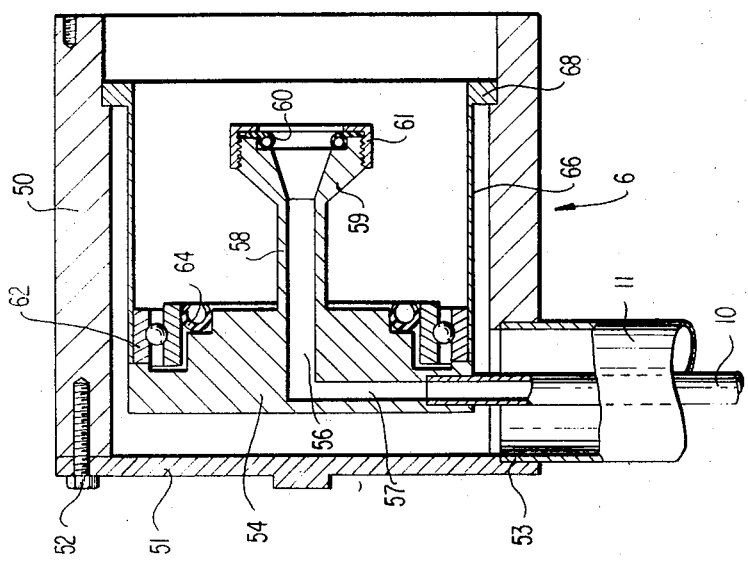

Referring now to FIGS. 1 and 3, the transfer swivel connection assembly 2 according to the present invention consists of a first and a second connector assembly, shown as a male inlet connector assembly 4 and a female outlet connector assembly 6, respectively. The conduits to be connected together include an inlet conduit 8 and an outlet conduit 10. The inlet conduit 8 has an outer insulating tube 9 surrounding the fluid conduit 8 with an evacuated vacuum insulating space formed therebetween. The fluid conduit 8 and outer insulating tube 9 are connected with the first connector assembly 4 with the connection being hermetically sealed. The outlet fluid conduit 10 also includes an outer insulating tube 11 surrounding the fluid conduit 10 along the entire length thereof, the space therebetween being evacuated to form a vacuum insulating layer, with both the fluid conduit 10 and the outer insulating conduit 11 being connected with the second outlet connector assembly 6 and hermetically sealed thereto.

The first, or inlet connector assembly 4 includes an outer housing 12 which may be formed of stainless steel or other material suitable for use with the fluid being transferred. When the swivel assembly is being used with cryogenic fluids, stainless steel is preferred, due to its low coefficient of heat conduction. The outer housing 12 is of a generally stepped cylindrical configuration and has a cylindrical cavity 13 formed therein and opening through one end thereof, as can be seen in FIG. 3. The housing 12 is preferably of one-piece construction, with the end 14 formed integrally with the side 12, as shown in FIG. 1. Alternatively, the end 14 may be formed separately, retained on the end of housing 12 by bolts 15 and hermetically sealed thereto by hermetic welding epoxy bonding, etc., as shown in FIG. 3. The one-piece outer housing construction of FIG. 1 may have a plurality of threaded mounting holes 17 provided around the periphery of the end 14 for attaching the swivel assembly to a support member. The bolts 15 of the two-piece construction of FIG. 3 can also be used to mount the swivel assembly to a support member.

A bore or opening 16 is formed through the side wall of the housing 12 to allow connection of the inlet conduit 8 and outer insulating tube 9 to be made with the first connector assembly 4. The outer insulating conduit 9 is sealingly attached to the outer housing 12 in the opening 16 by hermetically welding the conduit 9 to the housing 12, or by any other suitable means, such as adhesive bonding, etc. The connection between the outer tube 9 and the housing 12 must be able to withstand a high vacuum and temperature differential without leakage.

A first conduit connector 18 is rigidly mounted within the cavity 13. The connector 18 consists of a first stepped cylindrical body portion 20 having a smaller diameter longitudinal portion 21 extending from one end thereof. A longitudinal bore 22 extends through the longitudinal extension 21 and intersects with a second bore or passage 24 lying at right angles to longitudinal bore 22 and opening through the side of the cylindrical portion 20. The first inner inlet conduit 8 is rigidly and sealingly connected with the second bore or passage 24 and, as a result, with the first stepped cylindrical body 20, by hermetic welding or any other suitable means, such as adhesive bonding, etc., into the bore 24, which may have a stepped portion, as shown in FIG. 3, if desired. As with the connection of the outer tube 9, the connection of conduit 8 with cylindrical portion 20 must withstand a high vacuum and temperature differential without leakage or failure.

The first, or inlet pipe connector 18 also includes a tapered nozzle member 26 having a bore therethrough and slidably mounted on the longitudinal extension 21 of the first stepped cylindrical body portion 20. A flat spacer ring 27 is positioned on the tapered nozzle 26 against a flat end surface thereof adjacent the tapered end 28 for spacing the tapered nozzle 26 relative to the abutting end of the second, outlet connector assembly 6 and to reduce the friction between the adjoining members, as will be described hereinafter. The spacer ring 27 is made of Teflon or other suitable material.

A stainless steel bellows 29 is welded at one end to a shoulder on the first stepped cylindrical body portion 20 and at its other end to the side of the slidable tapered nozzle 26 opposite the taper 28. The bellows 29 has sufficient length and compressability to assure a positive sealing engagement between the abutting inner positions of the two passage connector sections. The bellows 29 is compressed when the first and second connector assemblies 4 and 6 are assembled to permit the tapered nozzle 26 to the first connector 4 to seat properly in the corresponding member of the second female connector section 6 in sealing relationship therewith.

A spacer-insulator assembly consisting of a first thin-walled tubular inner barrel 30 having a flat radial end surface 31 is hermetically welded to a shoulder of the first stepped cylindrical body portion 20. A second, outer thin-walled cylindrical tube 32 is sealingly joined between the open end of the first, inlet housing 12 and the flat radial end surface 31 of the first tubular inner barrel 30 by hermetic welding or any other suitable means, such as brazing, adhesive-bonding, etc.. A thin cylindrical ring 33 is formed on the exterior end surface 31, as shown in FIG. 3 by machining the members 30, 31 and 33 from a single piece of stock material. The thin cylindrical ring 33 forms a sealing surface for engagement with a seal member provided in the female outlet connection assembly 6, as will be described hereinafter. The thin-walled tubular members 30, 32 and 33 are preferably made from stainless steel and are designed to have as thin a cross-sectional area as possible to reduce the heat loss due to conduction through the material when transferring cryogenic fluids although the three structural members 30, 31 and 33 are preferably machined as a single, one-piece unit, the individual pieces can be formed separately and joined together to form a unitary structure by hermetic welding, brazing, adhesive bonding, etc.

The second, outer thin cylindrical tube 32 is maintained in spaced-apart relationship with the first inner barrel 30, and in combination therewith, provides a sealed space surrounding the passage provided by the longitudinal bore 22. By evacuating the space between inner barrel 30 and outer tube 32, a highly efficient insulation space is provided therearound in combination with cavity 13 of housing 12. In addition, the provision of the first inner barrel 30 surrounding the first inlet pipe connector assembly 18 prevents the leakage of fluid from the connection assembly in the event that a leak occurs within the inlet pipe connector assembly and/or passage therethrough.

A ball bearing assembly 34 is retained against a shoulder 36 on the inlet housing 12 by means of a retainer ring 38 which fits into a groove 39 formed in the inlet housing 12 to allow frictionless movement between the first inlet connector assembly 4 and the second outlet connector assembly 6. A retainer and cover ring 40 is positioned around the housing 12 and engages the outer race of the bearing assembly 34 to secure the inlet connector assembly 4 to the outlet connector assembly 6 while allowing relative rotational movement therebetween. The retainer ring 40 is secured to the second connector assembly 6 by means of a plurality of retaining bolts 42. A seal 44 which may be in the form of an O-ring or other suitable configuration, is positioned in a groove formed in the retainer ring 40 for sealing the retainer ring 40 relative to the end of the housing of the second outlet connector assembly 6, while a dynamic seal 46, made of Teflon and having a generally U-shaped cross-sectional configuration, or other suitable dynamic seal configuration, is positioned between the inner surface of the retainer ring 40 and the side of the inlet housing 12 to prevent the leakage of air and fluid therebetween. Although not shown in the drawings, the dynamic seal 46 has a spiral-wound stainless steel coil or spring therein to maintain the seal open at all times to assure sealing contact with the retainer ring 40 and the stepped shoulder 36.

The second or outlet connector assembly 6 includes a cylindrical shaped housing 50 constructed of stainless steel or other suitable material which is closed at one end. The housing 50 is preferably of one-piece construction, as shown in FIG. 1, or may be an open ended tube having one end closed by a cap 51 secured by bolts 52 as shown in FIG. 3. The cap 51 is then hermetically sealed to the housing 50 by hermetic welding to assure a leak-proof assembly. As with the male inlet connector assembly 4 of the embodiment of FIG. 1, the housing 50 of the outlet connector assembly 6 may also be provided with a plurality of threaded holes 17 in the end thereof for attaching the outlet assembly 6 to a support member movable relative to the inlet assembly 4. The bolts 52 of the two-piece assembly of FIG. 3 can also be used to mount the swivel assembly to a support. A bore 53 is formed through the wall of the housing 50 adjacent to its closed end, as seen in FIGS. 1 and 3. The outer insulating tube 11 surrounding the second conduit 10 is sealingly connected with the outlet housing 50 at the bore 53, preferably by hermetic welding, or by any other suitable means, such as adhesive bonding, etc., in bore 53.

A second, outlet pipe connector in the form of a female connector 54 is rigidly mounted within the interior of the female housing 50. The female connector 54 includes a small-diameter cylindrical extension 58 having an enlarged threaded end portion 59. An internal passage or bore 56 passes longitudinally through the cylindrical extension 58 and tapers outwardly at its open end within the enlarged end portion 59. A second internal passage 57 is formed in the female pipe connector 54 and intersects the first internal passage or bore 56 at right angles. The second, or outlet conduit 10 is sealingly connected with the second internal passage 57, preferably by hermetic welding, or by any other suitable means, such as brazing, adhesive-bonding, etc. If desired the housing 50 may have a stepped portion formed therein around the opening of passage 57, into which the conduit 10 can be positioned as shown in FIG. 3.

A further dynamic seal 60, made of Teflon and having the same construction as the dynamic seal 46, is positioned against the end surface of the enlarged end portion 59 of the cylindrical extension 58 around the tapered opening, and is retained in place by means of a threaded cap 61 which engages threads on the exterior surface of the enlarged end portion 59. The cap 61 has an opening in its end through which the tapered end 28 on the nozzle 26 of the first, inlet connector assembly 4 can extend and sealingly engage the seal 60 to form a sealed connection with the second, outlet connector 54. The open side of the seal 60 faces the interior of the extension 58 so that the seal will be expanded by the pressure of the fluid being transferred through passage 56 to maintain a sealed connection.

The second outlet pipe connector 54 is rigidly mounted within the interior of the housing 50 by means of a thin wall tube 66, which is sealingly joined to and supported by the housing 50 by means of a locating ring 68 formed as a part of tube 66, or attached to the end of the tube 66 and to the interior surface of the housing 50 by any suitable means, such as hermetic welding. The opposite end of tube 66 is welded hermetically to the connector 54 to form a sealed joint therewith. A ball bearing assembly 62 is positioned between the interior surface of the end of tube 66 and the outlet pipe connector 54, the bearing 62 being located on a shoulder formed on the connector 54. A third dynamic seal 64 constructed from Teflon and having the same construction as dynamic seals 46 and 60 including a spiral stainless steel spring mounted therein (not shown), is positioned in a shouldered recess between the bearing 62 and the outlet connector 54. The thin cylindrical ring 33 on the surface 31 fits between the bearing 62 and seal 64 in sealing engagement therewith when the male and female assemblies are joined together, as shown in FIG. 1 to permit the seal 64 to seal between the ring 33 and the stepped surface of connector 54. This assembly maintains a sealed chamber around the connection between the passages 22 and 56 to prevent escape of fluid being transferred therethrough into the surrounding insulating space in the event that a leak should develop in the male and female connectors. By evacuating the space between the housing 50 and the inner barrel or cylindrical member 66, a highly efficient insulating space is provided therearound. Since the heat transfer loss of an insulator by conduction through the material itself is a function of the surface area of the structural members including the cross-sectional thickness, the cylindrical members 30, 32 and 33 of the male inlet connector assembly 4, and the cylindrical member 66 of the female outlet connector assembly 6, are made as long and as thin in cross-sectional area as possible to minimize heat loss due to conduction.

In operation, the first, or male inlet connector assembly 4 is moved in the direction indicated by the arrow in FIG. 3 to position the first inner barrel 30 and its flat radial end surface 31 around the small diameter cylindrical extension 58 of the pipe connector 54 in the second, female outlet assembly 6. The inner race of the bearing 62 engages and seats against the outer surface of the cylindrical member 33 and the end surface 31 of the male connector 4 to locate the male connector assembly 4 axially and radially relative to the female connector assembly 6. Simultaneously, the tapered end 28 of the sliding nozzle 26 in the male connector assembly 4 passes through the dynamic seal 60 and sealingly engages therewith to form a sealed connection between the passage 22 in the male assembly 4 and the passage 56 in the female assembly 6. The stainless steel bellows 29 applies an axial force on the tapered nozzle 26 to maintain the tapered end 28 in sealing arrangement with the seal 60 at all times. The Teflon spacer ring 27 provides the necessary clearance between the tapered end 28 of the nozzle 26 and the tapered surface of the opening in the enlarged end 59 to prevent excessive wear or damage to the dynamic seal 60 as a result of contact between these parts during rotation of the two parts 4 and 6 of the connection assembly.

When the inner barrel 30 and tapered nozzle 26 of the first, male inlet connector assembly 4 are in their proper positions in the second, female outlet connector assembly 6, the retainer ring 40 is positioned against the end of the female housing 50 and the retaining bolts 42 are tightened to clamp the assemblies 4 and 6 together, thereby completing the connection between the conduits 8 and 10.

The space between the thin-walled tubular members 30 and 32, which continues around the male inlet connector 18 within housing 12, and the space between the thin-walled cylindrical member 66 and housing 50 surrounding the female outlet connector 54, are then evacuated to a high vacuum condition by connecting a vacuum pump to the insulating spaces in the inlet and outlet conduits or directly to the two portions of the swivel connection assembly and removing all air therefrom. The vacuum pump can remain attached or disconnected and the point of connection sealed.

When the two portions 4 and 6 of the swivel assembly 2 are mated, ambient pressure is trapped in the interim spaces designated as A and B. Since the cryogenic liquid being transferred is under pressure, the cryogenic liquid pressure is greater than the ambient pressure trapped in space B. Since the seal 60 is open toward the high pressure side or toward the cryogenic liquid, the higher cryogenic liquid pressure tends to spread the dynamic seal 60 and accordingly, improve its sealing capacity. If seal 60 permits liquid to enter space B, the pressure in B will increase to a greater value than the ambient pressure in space A. Since the dynamic seal 64 is open toward the higher pressure side or toward space B, the subsequent pressure increase in space B tends to spread the dynamic seal 64 and improve its sealing capacity. When cryogenic liquid is being transferred, the portion of space A that is in closest proximity to outlet connector 54 will be at nearly the temperature of the cryogenic liquid which will cause the air molecules in space A to freeze out thereby creating a partial vacuum in space A.

The dynamic seal 46 is open toward the higher of the pressures between that in space A and ambient pressure external to the swivel. Since a partial vacuum exists in space A the seal is open toward the exterior to ambient pressure. Thus, the ambient pressure tends to spread the dynamic seal 46 and improves it sealing capacity.

The housing 12 of the first connector assembly 4 can rotate relative to the housing 50 of the second, connector assembly 6 through the first ball bearing assembly 34 while the first and second tubular barrels 30 and 32 of the first assembly can rotate relative to the female pipe connector 54 and third tube 66 through second ball bearing assembly 62. A minimal amount of friction will occur between the dynamic seal ring 60 and the tapered end of the nozzle 26, as well as between the Teflon spacer ring 27 and the parts in contact therewith, namely the tapered nozzle 26 and the threaded cap 61, due to the movement of the male inlet connection assembly 4 relative to the female connection assembly 6. However, the wear caused thereby will be minimal.

As can be seen from the foregoing description, the structure according to the present invention incorporates three positive pressure dynamic seals 46, 60 and 64 between the inner flow passages 22, 24, 56 and 57 and the ambient atmosphere. In addition, an O-ring seal 44 is employed between the male housing 12 and the female housing 50. The innermost dynamic seal 60 prevents fluid from escaping at the point of connection of the passage 22 with passage 56. The middle dynamic seal 64 is a back-up seal for the inner seal 60 and serves to confine the fluid should the inner seal 60 develop a leak.

The outer dynamic seal 46 is used between the male housing 12 and retainer ring 40 to prevent ambient air and associated moisture from condensing upon the bearing assembly 34, while O-ring 44 is retained between the retainer ring 40 and the female housing 50 to complete the seal between the male and female housings 12 and 50. Thus, complete efficient insulation of the connection passages 22, 24, 56 and 57, by means of a sealed evacuated space as well as the prevention of the escape fluid from any of these passages should a leak occur is assured by the above-described construction of the present invention.

It must be well understood that the invention is not limited to the described embodiment and that many changes may be introduced therein without departing from the scope of the present patent application.

I claim:

1. A swivel connection assembly for rotatably and detachingly connecting two insulated fluid conveying conduits together while allowing rotational movement of the conduits relative to each other comprising, a first and a second connector each of said first and second connectors having a passage formed therethrough for connection with said insulated conduits, said first and second connectors adapted for sealing engagement with each other to communicate the passages fromed therein, said first and second connectors being rigidly mounted within a first and a second housing, respectively, in spaced-apart relationship therewith, each of said first and second housings being open at one end and having a passage formed through the walls thereof for sealing connection with the exterior surfaces of said first and second insulated fluid conveying conduits, respectively, clamping means for retaining said first and second housings in assembled relationship and bearing means for effecting relative rotational movement between said housings, first dynamic sealing means formed between first and second connectors at the area of engagement with each other and surrounding the passages therethrough for maintaining a sealed connection therebetween and second dynamic sealing means formed between said second connector and an end surface of said first housing to form a sealed chamber surrounding said first and second connectors at the area of engagement therebetween.

2. A swivel connection assembly as claimed in claim 1 wherein said bearing means comprises first bearing means fixedly positioned on said first housing and engageable with said second housing, second bearing means fixedly mounted within said second housing and engageable with said first housing, and wherein said clamping means surrounds said first bearing means, said first and second bearing means providing low friction rotation between said first and second housings and said first and second connectors relative to each other.

3. A swivel connection assembly as claimed in claim 1, wherein said clamping means is removably secured to said second housing and wherein said assembly further comprises third seal means positioned adjacent said clamping means for engagement with an end surface of the open end of the second housing to provide a static seal between said first and second housings.

4. A swivel connection assembly as claimed in claim 1, wherein said first connector comprises a generally cylindrical shaped block having a longitudinal extension on one end thereof, said passage means being formed through said longitudinal extension, a nozzle having a tapered exterior end portion thereon and slidably mounted on said longitudinal extension, and bias means positioned between said cylindrical portion and said nozzle to bias said nozzle away from said cylindrical portion in the direction of said second connector, said second connector being of a generally cylindrical configuration and having a longitudinal extension formed thereon, said passage in said second connector being formed within said longitudinal extension, and the end of said passage in said longitudinal extension of said second connector being flared outwardly for engagement with said tapered exterior end portion of said nozzle of said first connector by way of said first dynamic sealing means.

5. A swivel connection assembly as set forth in claim 4, further comprising a first cylindrical sleeve having one end attached to said cylindrical block of said first connector and extending in the direction of said longitudinal extension, said longitudinal extension and said nozzle being positioned in a spaced-apart relationship with said first cylindrical sleeve, a second cylindrical sleeve having one end attached to the open end of said first housing in spaced-apart relationship with said first cylindrical sleeve, and an end wall sealingly connecting the remaining ends of said first and second cylindrical sleeves, said end sealingly engaging said second seal means when said first and second connectors are joined together.

6. A swivel connection assembly as claimed in claim 4, further comprising a third cylindrical sleeve having one end thereof rigidly attached to said second connector and extending in the direction of said cylindrical extension formed thereon in spaced-apart relationship therewith, locating means rigidly secured to the other end of said third cylindrical sleeve and to the inner surface of said second housing to maintain said third cylindrical sleeve and said second connector in spaced-apart relationship with said second housing.

7. A swivel connection assembly as set forth in claim 4, wherein said bias means on said first connector comprises a corrugated bellows having one end sealingly secured to said first connector and the other end sealingly secured to said nozzle.

8. A swivel connection assembly as claimed in claim 4, further comprising a cup-shaped seal retainer threadedly retained on the exterior surface of said end portion of said second connector, said seal retainer having an opening therethrough, said second sealing means comprising a toroidal shaped flexible seal retained against the end of said longitudinal extension of said second connector by said retainer for engagement with the tapered surface of said nozzle of said first connector, and said nozzle having a flexible spacer mounted thereon for engaging said end of said cup-shaped retainer member.

* * * * *